US007704391B2

(12) United States Patent
Garrison

(10) Patent No.: US 7,704,391 B2
(45) Date of Patent: *Apr. 27, 2010

(54) MOLECULAR ARRANGEMENT MAGNETIC TREATMENT APPARATUS AND METHOD

(75) Inventor: Roy Lee Garrison, Pensacola, FL (US)

(73) Assignee: Gemini Environmental Corporation, Austin, TX (US)

( * ) Notice: Subject to any disclaimer, the term of this patent is extended or adjusted under 35 U.S.C. 154(b) by 259 days.

This patent is subject to a terminal disclaimer.

(21) Appl. No.: 11/443,726

(22) Filed: May 31, 2006

(65) Prior Publication Data

US 2007/0278156 A1    Dec. 6, 2007

(51) Int. Cl.
*B01D 35/06* (2006.01)
(52) U.S. Cl. .................. 210/222; 210/695; 209/214
(58) Field of Classification Search ........... 210/222, 210/223, 695; 204/554, 557, 660, 664; 209/636, 209/212–217, 226
See application file for complete search history.

(56) References Cited

U.S. PATENT DOCUMENTS

| | | | | |
|---|---|---|---|---|
| 3,206,657 A | * | 9/1965 | Moriya | 335/303 |
| 3,311,255 A | * | 3/1967 | Loveless | 220/324 |
| 3,489,669 A | * | 1/1970 | Ruhnke | 204/665 |
| 4,602,652 A | * | 7/1986 | Ayers | 137/15.08 |
| 5,589,065 A | * | 12/1996 | Bogatin et al. | 210/222 |
| 6,337,012 B1 | * | 1/2002 | Devine | 210/223 |

OTHER PUBLICATIONS

International Search Report for PCT/US 06/31769, Aug. 24, 2007, World Intellectual Property Organization, p. 1.*

* cited by examiner

*Primary Examiner*—Tony G Soohoo
*Assistant Examiner*—David C Mellon
(74) *Attorney, Agent, or Firm*—David O. Simmons

(57) ABSTRACT

A molecular arrangement magnetic treatment apparatus and method includes a material container with an inlet and an outlet where the material to be treated is introduced at the inlet and is released at the outlet and where the material container is sized so as to provide an enclosed space into which the material expands and loses velocity. A material passageway is connected at one end to the inlet and at another end to the outlet such that the material must pass through the material passageway. And at least one pair of magnets is provided that are oriented such that material in the passageway must pass between a north pole and a south pole of the pair of magnets. In one embodiment, the at least one pair of magnets is self aligning such that the north pole and the south pole are free to move so that the north pole and the south pole are always facing each other. In another embodiment, a precipitator is connected with the material container and negatively charged material is precipitated from the material after the material has been negatively charged.

20 Claims, 4 Drawing Sheets

US 7,704,391 B2

MOLECULAR ARRANGEMENT MAGNETIC TREATMENT APPARATUS AND METHOD

FIELD OF THE INVENTION

This invention relates to a molecular arrangement magnetic treatment apparatus and method. In particular in accordance with one embodiment, the invention relates to a molecular arrangement magnetic treatment apparatus including a material container with an inlet and an outlet where the material to be treated is introduced at the inlet and is released at the outlet and where the material container is sized so as to provide an enclosed space into which the material expands and loses velocity. A material passageway is connected at one end to the inlet and at another end to the outlet such that the material must pass through the material passageway. And at least one pair of magnets is provided that are oriented such that material in the passageway must pass between a north pole and a south pole of the pair of magnets.

BACKGROUND OF THE INVENTION

The disposal of waste is a vexing problem involving the tension between disposing of one type of waste and creating an even more toxic waste in its place. By way of example only and not by limitation, the prior art techniques for disposing of household and industrial wastes include a wide variety of prior art "solutions" ranging from simply burying the waste to attempts to change the waste from one form to another as by incineration. Burying the waste may get it out of sight and out of mind for a time but it does not actually dispose of the waste and results most often in long term health hazards caused by the leaching of waste residue and by products into underground water systems, for one example only.

Incineration of waste material has long been a preferred waste material treatment since it greatly reduces the mass of waste material to be handled thereafter. Unfortunately, the end product of the prior art incineration systems is often the most toxic materials known to man, including, for example only, dioxin. This is a particularly vexing problem for incineration systems where the waste is diverse in makeup and ranges from apple cores to mattresses to baby diapers.

Thus, there is a need in the art for an apparatus and method for treating waste materials such that the disposal of waste reduces the waste itself as well as prevents the creation of even more toxic waste as an end product. It, therefor, is an object of this invention to provide an apparatus and method for employing a non reactive molecular arrangement in treating material that is easy to use and inexpensive in comparison to the benefit derived from its use and that effectively reduces the treated material from a potentially toxic nightmare to a harmless and easily controlled residue.

SUMMARY OF THE INVENTION

Accordingly, the molecular arrangement magnetic treatment apparatus and method of the present invention includes a material container with an inlet and an outlet where material to be treated is introduced at the inlet and is released at the outlet and where the material container is sized so as to provide an enclosed space into which the material expands and loses velocity. A material passageway is connected at one end to the inlet and at another end to the outlet such that the material must pass through the material passageway. And at least one pair of magnets oriented such that material in the passageway must pass between a north pole and a south pole of the at least one pair of magnets.

According to another aspect of the invention, the at least one pair of magnets is self aligning such that the north pole and the south pole are free to move so that the north pole and the south pole are always facing each other. In another aspect, the at least one pair of magnets are rod shaped. According to one aspect, the material container includes a moveable lid. In another aspect, the moveable lid includes a safety release cover and, in another, a dual action lift connected on one end to the material container and on another end to the moveable lid.

According to another aspect of the invention, the material container includes a moveable access door. In another aspect, a precipitator is connected to the material container. In another aspect, the material to be treated is selected from a group comprising: gas and liquid.

According to another embodiment of the invention, a molecular arrangement magnetic treatment apparatus includes a material container with a moveable lid and with an inlet and an outlet where material to be treated is introduced at the inlet and is released at the outlet and where the material container is sized so as to provide an enclosed space into which the material expands and loses velocity. A material passageway is connected at one end to the inlet and at another end to the outlet such that the material must pass through the material passageway. And, a number of pairs of magnets are provided and oriented such that material in the passageway must pass between a north pole and a south pole of the pairs of magnets such that the material is given a negative electrical charge and where at least one pair of the number of pairs of magnets is self aligning such that the north pole and the south pole are free to move so that the north pole and the south pole are always facing each other.

According to another aspect of this invention, all of the pairs of magnets are self aligning. In another aspect, the moveable lid includes a safety release cover. In another aspect, a dual action hydraulic arm is connected on one end to the material container and on another end to the moveable lid. In another aspect, the material container includes a moveable access door. According to a further aspect, a precipitator is connected to the material container. In another aspect, the material is selected from a group comprising: gas, steam and liquid.

In accordance with another embodiment of the invention, a molecular arrangement magnetic treatment method for treating material includes the steps of providing a material container with a moveable lid and with an inlet and an outlet where material to be treated is introduced at the inlet and is released at the outlet and where the material container is sized so as to provide an enclosed space into which the material expands and loses velocity; connecting a material passageway at one end to the inlet and at another end to the outlet such that the material must pass through the material passageway; orienting a number of pairs of magnets such that material in the passageway must pass between a north pole and a south pole of the pairs of magnets such that the material is given a negative electrical charge and where at least one pair of the pairs of magnets is self aligning such that the north pole and the south pole are free to move so that the north pole and the south pole are always facing each other; and introducing material to be treated into the inlet.

According to another aspect of this invention, the method includes the steps of connecting a precipitator to the material container and precipitating negatively charged material from the material after the material has been negatively charged. In another aspect, the method includes the step of providing a moveable access panel to the material container. In another aspect, the material to be treated is selected from a group comprising: gas, steam and liquid.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
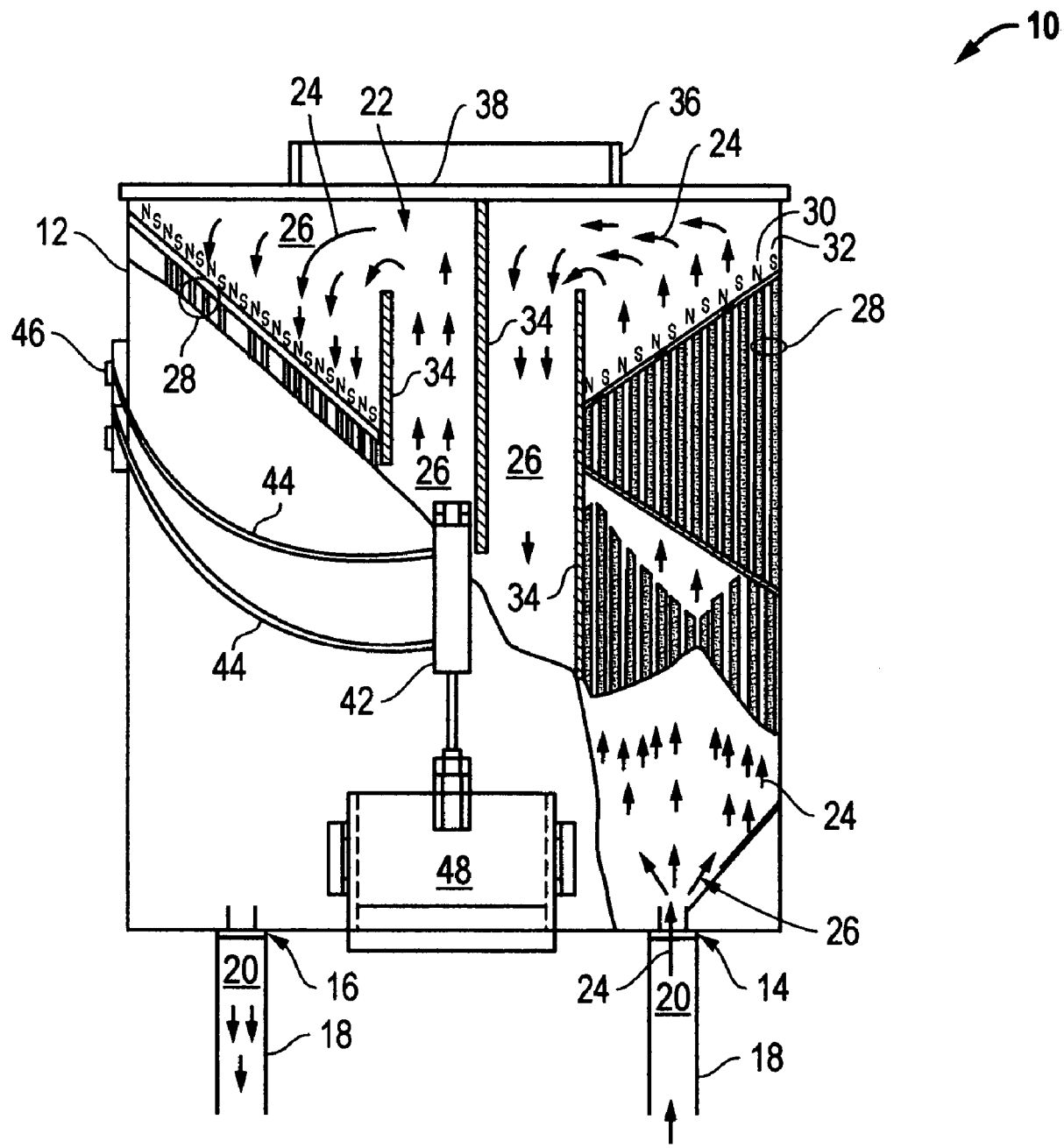
FIG. 1 is a side partial cut away view of the magnetic treatment apparatus according to one embodiment of the invention.

The preferred embodiment of the present invention is illustrated by way of example in FIGS. 1-5. With specific reference to FIGS. 1 and 2, the molecular arrangement magnetic treatment apparatus and method 10 according to one embodiment of the invention includes material container 12 with an inlet 14 and an outlet 16. Inlet 14 and outlet 16 are attached to conduit 18 for directing material 20 into inlet 14 and away from outlet 16. Importantly, relative to each other, container 12 is large as compared to the size of inlet 14, outlet 16 and conduit 20 such that the interior 22 of material container 12 is a large enclosed space 22 into which material 20 is directed. The result is that material 20 introduced to material container 12 at inlet 14 loses velocity and slows down.

Arrows 24 in FIG. 1 show the direction of the flow of material 20 in the interior 22 of material container 12. From inlet 14, material 20 is directed into material passageway 26. Material passageway 26 is constructed so as to maximize its overall length within the interior 22 of material container 12. As a result, material passageway 26 runs up and down the interior 22 of material container 12 as illustrated. Certainly any design now known or hereafter developed for effectively increasing the length of material passageway 26 is satisfactory for the purposes of the invention.

Importantly, material passageway 26 includes at least one pair of magnets 28 such that each pair of magnets 28 is positioned such that the north pole 30 of one magnet 28 faces the south pole 32 of each magnet pair 28. The magnets 28 may be included in all or some of the material passageway 26 as shown in FIG. 1. According to one embodiment, many multiple pairs of magnets 28 are positioned side by side in material passageway 26 and effectively fill up the entire material passageway 26. Whether or not multiple pairs of magnets 28 are used, in every case Applicant's molecular arrangement magnetic treatment apparatus and method 10 requires that all material 20 introduced at inlet 14 must pass between the north pole 30 and the south pole 32 of at least one magnet pair 28 prior to reaching outlet 16.

Material passageway 26 may be created from barrier walls 34 and pairs of magnets 28 may be connected within material passageway 26 to barrier walls 34, by way of example only and not by limitation, as illustrated.

Figure 2:
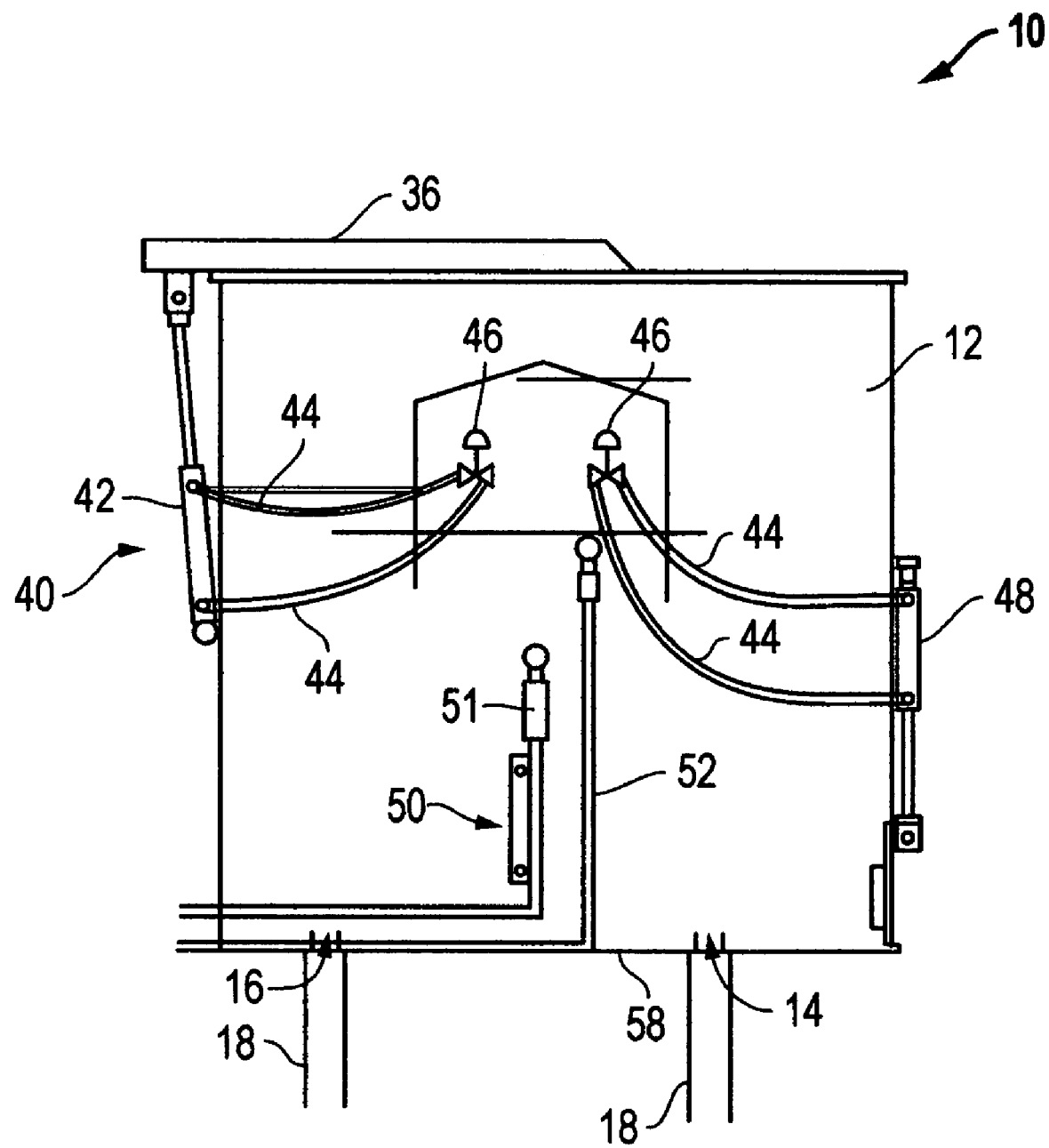
FIG. 2 is a side view of the invention of FIG. 1.

FIGS. 1 and 2 also illustrate other features of the invention including moveable lid 36 and safety release cover 38. Moveable lid 36 is conformed to allow the release of material 20 from within material container 12 at another location besides outlet 16. Moveable lid 36 is preferably very heavy and resists movement under normal operating conditions. In the event of a sudden increase of pressure within material container 12, however, moveable lid 36 is provided to prevent damage or destruction of magnetic treatment apparatus 10. Likewise, safety release cover 38 is an explosive release cover, as known in the art, for providing an escape route for material 20 from the interior 22 of material container 12 should an explosion occur. Applicant has determined that the likelihood of an over pressure event is small but that it is reasonable to provide for it rather than risk damage to the apparatus 10.

An additional feature of the moveable lid 36 includes a dual action lift 40 as shown in FIG. 2. Dual action lift 40, according to one embodiment, is a hydraulic arm 42 connected on one end to material container 12 and on the other end to moveable lid 36. Hydraulic lines 44 are connected to controller 46 so that a user can intentionally raise and lower moveable lid 36 for maintenance, inspections or for any other purpose. Additionally, hydraulic arm 42 acts as a shock absorber should a rapid expansion event occur. The construction and operation of hydraulic arm 42 and hydraulic lines 44 are well within the ability of those of ordinary skill in the art and are not discussed more fully hereafter.

Moveable access door 48, as shown in FIG. 1, is also connected to a hydraulic arm 42 and by hydraulic lines 44 to a controller 46. Access door 48 enables a user to gain access to the interior 22 of material container 12 at a location other than at moveable lid 36.

FIG. 2 also shows another feature of the invention in which fire fighting devices 50 are provided in the form of CO2 lines 51 and water lines 52. Again, in an abundance of caution Applicant's magnetic treatment apparatus 10 includes fire fighting devices 50 to hedge the risk of damage and destruction should an explosive event occur.

As used herein the term "material" includes any gas, liquid or solid material. It is anticipated by the Applicant that a series of magnetic treatment apparatus 10 will be used at different locations in an incineration process so as to capture gas, such as steam or smoke for example only, and liquids, such as results from condensed steam, for example, and solids resulting from incineration wherever occurring in an incineration process.

Figure 3:
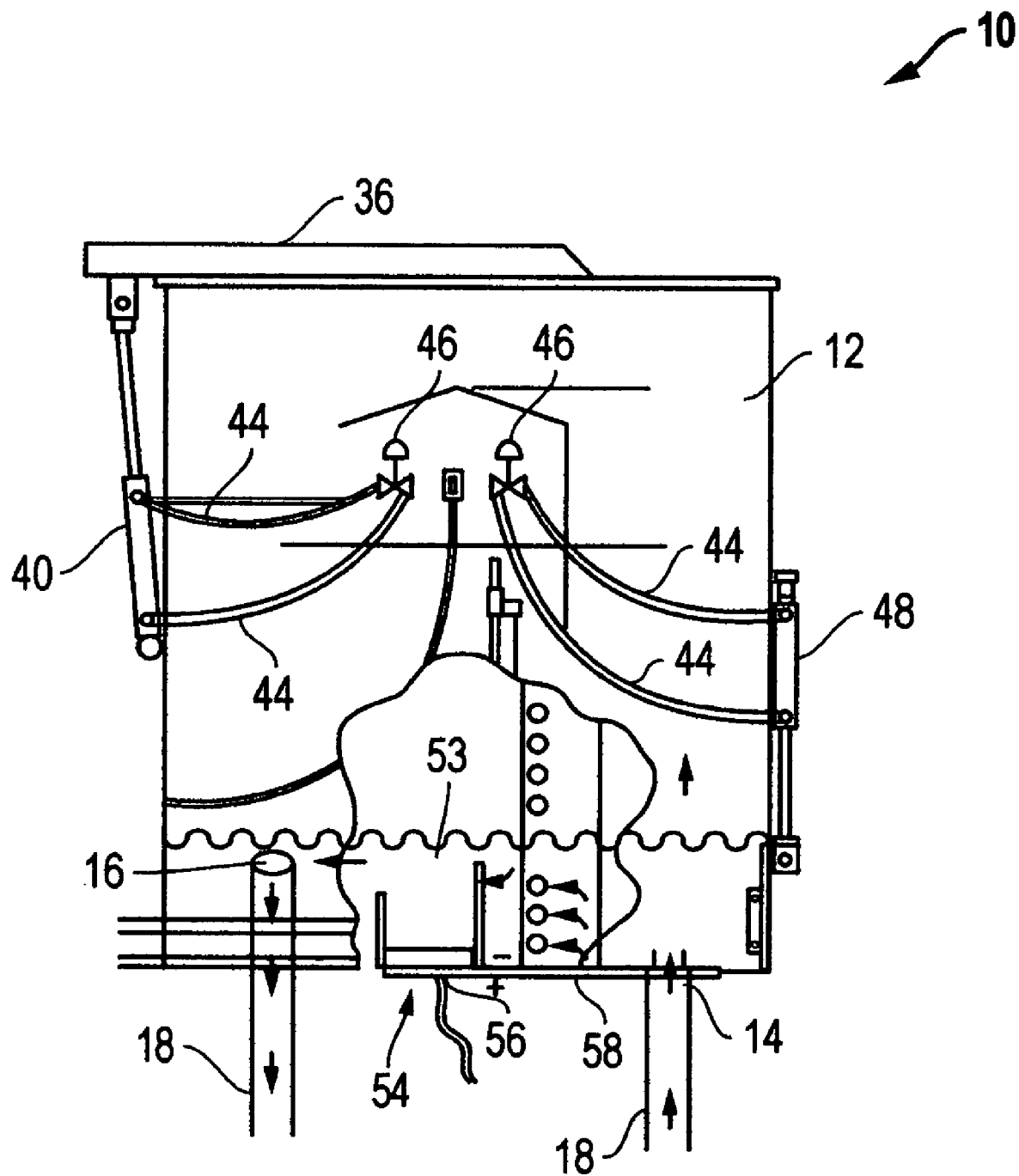
FIG. 3 is a side partial cut away view of another embodiment of the magnetic treatment apparatus.

Referring now to FIG. 3 another embodiment of the invention is disclosed in which a material 20 in the form of steam, for example only, is introduced at inlet 14 to material container 12. Material container 12 is partially filled with water 53 through which the steam must pass. A precipitator 54 is connected in the preferred form of a cathode 56 at the bottom 58 of material container 12. Importantly, all material 20, having passed between north poles 30 and south poles 32, is negatively charged by Applicant's molecular arrangement magnetic treatment apparatus 10. As a result, the use of precipitator 54 in the form of a cathode 56 causes all negatively charged material 20 to be collected in the bottom 58. Thereafter, periodically, the precipitated material 20 at the bottom 58 of the material container 12 may be removed through access door 48 as needed or desired. The advantageous result is that the water 53 is purified and may be safely used and reused as desired. Precipitated material 20 is likely to be a collection of heavy metals produced by metabolic waste processing units. Whatever precipitated material 20 is, once collected by precipitation it is capable of being recycled and reused.

Figure 4A:
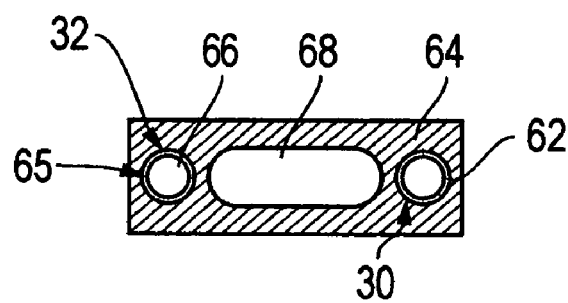
FIGS. 4A and 4B are enlarged views from the top and side of the self aligning magnets and passageway of the invention.
Figure 4B:
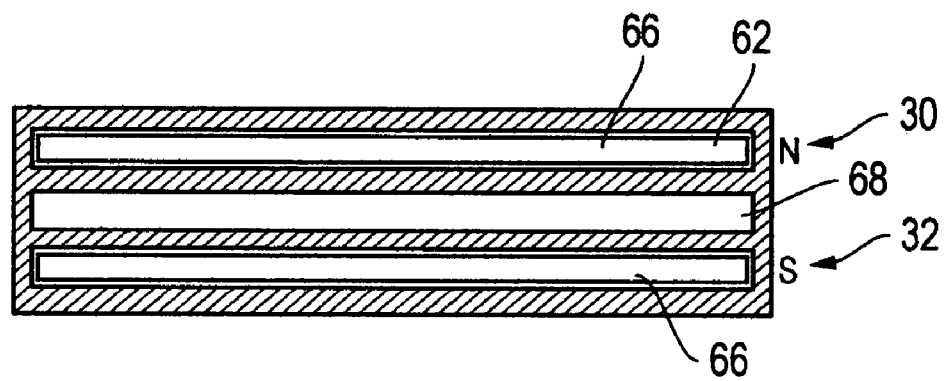

FIG. 4A is an enlarged top view and FIG. 4B is an enlarged side view of the pair of magnets 28 according to a preferred embodiment of the invention. Referring to FIG. 4A, rod shaped magnet 62 is moveably located in magnet holder 64. Magnet holder 64 includes a pair of spaces 65 conformed to moveably receive magnet 62 and rod shaped magnet 66. In a pair of rod shaped magnets 62 and 66, one is charged as a north pole 30 and the other is charged as the south pole 32. In between rod shaped magnets 62 and 66, magnet holder 64 includes magnet holder passageway 68. When, as anticipated in most situations, more than one pair of magnets 28 is used, each magnet holder 64 is located next to another magnet holder 64 such that material passageway 26 is completely filed with magnet holders 64 such that material 20 is forced to pass down at least one magnet holder passageway 68 and between the north pole 30 and the south pole 32 of at least one magnet pair 28.

Importantly, Applicant has determined that for optimum operation, the magnet pairs 28 of molecular arrangement magnetic treatment apparatus 10 must be self aligning. As the magnetic field changes from geographic location to geographic location and because magnetic fields often fluctuate within an active environment, such as for example only and not by limitation an incineration process with extreme temperatures and pressures, it is important that the magnet pairs 28 always be aligned north to south. Rod shaped magnets 62 and 66 freely rotate within rod shaped spaces 65 in magnet holder 64. In order to ensure the self aligning feature, a lubricant of any known type may be added such as graphite. Rod shaped magnets 62 and 66 may be sealed within magnet holder 64 with or without lubricant in order to prevent any material 20 or anything else from interfering with the smooth free movement of the magnets 62 and 66 within magnet holder 64.

Figure 5A:
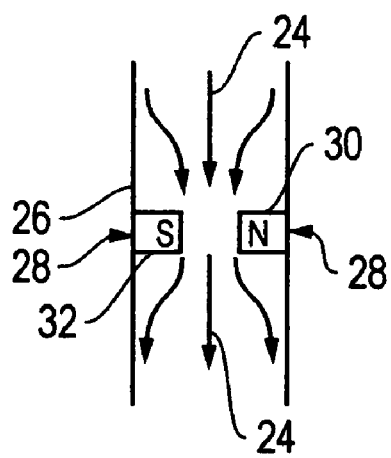
FIGS. 5A and 5B are schematic diagrams of material passing the north and south poles of a pair of magnets.
Figure 5B:
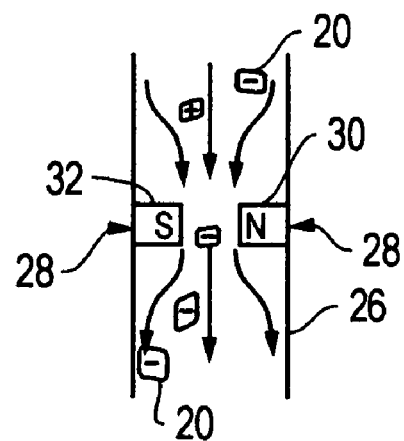

Referring now to FIGS. 5A and 5B, FIG. 5A shows the flow of material 20 by arrows 24 within material passageway 26. Again, all the material 20 that enters inlet 14 must pass by at least one pair of magnets 28 and in particular between a north pole 30 and a south pole 32. Material 20, as shown in FIG. 5B, may be either positively charged or negatively charged before passing by magnet pair 28. But all material 20 that passes by magnet pair 28 and north pole 30 and south pole 32 will become negatively charged. Importantly, the operation of Applicant's invention ensures, by manipulating the electrical potential of the material 20, that prior art dangerous emissions and chemical reactions simply can not occur. That is, introducing material 20 to the magnetic field aligns the material 20 to the same direction of the magnetic field alignments. That is, the molecules of all the material 20 are "arranged" by Applicant's invention. This creates a magnetic process moment in the material 20 that suspends reactivity or molecular bonding until such higher energies are applied to the material 20 thereby keeping it from collecting or reacting and forming dangerous crystalline structures, compounds, nuclear isotopes and other dangerous and toxic compounds.

Further, the north poles 30 and south poles 32 and resultant magnetic fields are automatically self aligned by the above described self alignment system during flow of material 20 through the invention during which small particles of material 20 and its mass pull on the magnetic fields thereby inducing electron movement to better alignment with the magnetic field pattern. Because magnetic rods 62 and 66 are not attached and can move freely inside the magnet holder 64 in spaces 65, the rods 62 and 66 can make otherwise impossible adjustments utilizing the magnetic strengths of the applied fields and the attraction north to south arrangements.

Applicant has determined that the design formula for calculating the correct flow space between pairs of magnets 28, within magnet holder passageway 68, is relevant to the gauss strength of the magnets 28 and the flow rate density of material 20 introduced to the molecular arrangement magnetic treatment apparatus 10. For example only and not by way of limitation, typical exhaust gas emissions containing particulate matter not exceeding 500 parts per million cubic feet will have a design free flow space, magnet holder passageway 68, of twice the distance of the diameter of a magnetic rod 28 with 2000 gauss.

By way of further explanation, this invention is a chamber device that can be manufactured to fit the flow and volumetric displacements of any emissions point where combustion by products are vented, such as to exhaust stacks for example only. Some critical benefits of the invention are that the magnetic field effect produced by magnets 28 arrange molecular scale particles of material 20 in such a way that they become significantly less reactive thereby enabling Applicant's invention to significantly reduce many types of harmful emissions common in waste disposal systems such as, for example only, the crystalline structures of dangerous dioxins.

All exhaust materials 20 (steam vapor or exhaust gas for example) normally exiting the current tens of thousands of combustion units powering everything from small dry cleaning operations to very large industrial furnace operations are suitable for use of Applicant's invention as disclosed herein. When utilized, the invention will reduce or completely eliminate the risk of dangerous dioxin emissions thereby assisting great new developments in assessing environmental impacts of constructing waste disposal technology as well as enabling the resurrection of industrial waste to energy projects that have been challenged as being environmentally unsafe. In short, Applicant's invention represents a powerful pollution reduction device for use by state and other environmental regulators worldwide. The need for the technology embodied by Applicant's has been sought by the EPA and the Department of Energy for decades and will help facilitate acceptable environmental solutions worldwide.

The best and most simple way to understand how the invention works and its concepts of how it affects particles or emission materials 20 is to key on one of the latest buzz words of new science "nano technology". Applicant's invention repositions tiny particles by reacting their electrons electrical state or its electrical position. In magnetism it is understandable that the fields of a same charge repel away from each other. Therefore, in this device the materials are directed through strong magnetic fields that induce a current upon particles 20 of a different electrical potential. The effect on the electron is like flipping over a tiny magnet so that its magnetic poles are aligned all in the same direction. By such molecular arrangement the apparatus 10 is able to prevent many chemical reactions that produce dangerous chemical compounds from ever occurring, as normally very reactive conditions are present during and directly after combustion. However, this invention introduces an environmental protective measure beyond filtration or scrubbing technologies. The Applicant realizes this is a multi-billion dollar solution to changing the waste industry and its various industrializations in converting waste to energy.

The description of the present embodiments of the invention has been presented for purposes of illustration, but is not intended to be exhaustive or to limit the invention to the form disclosed. Many modifications and variations will be apparent to those of ordinary skill in the art. For example, the apparatus may be used in series or separately. It can accommodate essentially any flowing material and is not limited to treating any particular type of material or waste. As such, while the present invention has been disclosed in connection with an embodiment thereof, it should be understood that other embodiments may fall within the spirit and scope of the invention as defined by the following claims.

What is claimed is:

1. A molecular arrangement magnetic treatment apparatus comprising:
   a. a material container with an inlet and an outlet, wherein material to be treated is introduced at said inlet and is released at said outlet and wherein said material container is sized so as to provide an enclosed space into which said material expands and loses velocity and through which said material passes;
   b. a material passageway provided within said enclosed space, wherein said material passageway extends between said inlet and said outlet in a manner such that said material must pass through said material passageway; and
   c. at least one pair of rod-shaped magnets disposed within said enclosed space, wherein said at least one pair of rod-shaped magnets is oriented such that said material in said passageway must pass between magnetic poles at opposing end portions of said at least one pair of rod shaped magnets and such that, as said material passes between said magnetic poles at said opposing end portions of said at least one pair of rod-shaped magnets, said material in the material passageway passes through a magnetic field effect produced by said at least one pair of rod-shaped magnets and wherein said at least one pair of rod-shaped magnets are disposed within said enclosed space in a manner allowing said at least one pair of rod-shaped magnets to move independent of each other such that the magnetic field effect dictates relative positioning of said at least one pair rod-shaped magnets for causing said at least one pair of rod-shaped magnets to be self-aligning with respect to each other.

2. The apparatus of claim 1, further comprising:
   d. at least one magnet holder disposed within the material passageway, wherein said at least one pair of rod-shaped magnets are sealed within respective spaced-apart magnet receiving spaces of said at least one magnet holder, wherein said at least one magnet holder includes a magnet holder passageway positioned between said pair of spaced apart magnet receiving spaces, wherein said at least one magnet holder is disposed within the material passageway in a manner whereby all of said material is forced to flow through the magnet holder passageway of said at least one magnet holder at at least one region along the material passageway, wherein a first one of said at least one pair of rod-shaped magnets is disposed within a first one of said spaced apart magnet receiving spaces in a manner allowing the first one of said at least one pair of rod-shaped magnets to move therein and a second one of said at least one pair of rod-shaped magnets is disposed within a second one of said spaced apart magnet receiving spaces in a manner allowing the second one of said at least one pair of rod-shaped magnets to move therein such that material in the material passageway passes through a magnetic field effect produced by said at least one pair of magnets as said material flows through the magnet holder passageway of said at least one magnet holder.

3. The apparatus of claim 1 wherein said at least one pair of rod-shaped magnets is oriented such that said at least one pair rod-shaped magnets extend longitudinally along at least a portion of a length of the material passageway.

4. The apparatus of claim 1 wherein said material container includes a moveable lid.

5. The apparatus of claim 4 wherein said moveable lid includes a safety release cover.

6. The apparatus of claim 4 further including a dual action lift connected on one end to said material container and on another end to said moveable lid.

7. The apparatus of claim 1 wherein said material container includes a moveable access door.

8. The apparatus of claim 1 further including a precipitator connected to said material container.

9. The apparatus of claim 1 wherein said material is selected from a group consisting of: gas and liquid.

10. A molecular arrangement magnetic treatment apparatus comprising:
    a. a material container with a moveable lid and with an inlet and an outlet, wherein material to be treated is introduced at said inlet and is released at said outlet and wherein said material container is sized so as to provide an enclosed space into which said material expands and loses velocity and through which said material passes;
    b. a material passageway provided within said enclosed space, wherein said material passageway extends between said inlet and said outlet in a manner such that said material must pass through said material passageway; and
    c. a plurality of pairs of rod-shaped magnets disposed within said enclosed space, wherein said plurality of rod-shaped magnets are oriented such that material in said material passageway must pass between magnetic poles at opposing end portions of said plurality of pairs of rod-shaped magnets such that said material is given a negative electrical charge and such that, as said material passes between said magnetic poles at said opposing end portions of said plurality of pairs of rod-shaped magnets, said material in the material passageway passes through a magnetic field effect produced by said plurality of rod-shaped magnets, wherein adjacent pairs of said plurality of rod-shaped magnets are oriented such that a north pole of a first magnet of an adjacent pair of magnets is adjacent a south pole of a second magnet of the adjacent pair of magnets and a south pole of the first magnet is adjacent a north pole of the second magnet, wherein said poles of the first magnet provide a first resultant magnetic field and said poles of the second magnet provide a second resultant magnetic field, wherein said first and second resultant magnetic fields jointly define at least a portion of the magnetic field effect and wherein said plurality of rod-shaped magnets are each movably disposed within said enclosed space in a manner allowing said plurality of rod-shaped magnets to move independent of each other such that the magnetic field effect provided by adjacent ones of said plurality of rod-shaped magnets dictates relative positioning of said adjacent ones of said plurality of rod-shaped magnets for causing said adjacent ones of said plurality of rod-shaped magnets to be self-aligning with respect to each other.

11. The apparatus of claim 10, further comprising:
    a magnet holding structure disposed within the material passageway, wherein the magnet holding structure includes a plurality of spaced-apart magnet receiving spaces and a plurality of magnet holder passageways, wherein each one of said magnet holder passageways is positioned between an adjacent pair of said magnet receiving spaces and wherein the magnet holding structure is disposed within the material passageway in a manner whereby all of said material is forced to flow through at least one of said magnet holder passageways at at least one region along the material passageway, wherein each one of said magnets is disposed within a respective one of said magnet receiving spaces and wherein all of said plurality of pairs of magnets are are oriented such that said at least one pair rod-shaped magnets extend longitudinally along at least a portion of a length of the material passageway.

12. The apparatus of claim 10 wherein said moveable lid includes a safety release cover.

13. The apparatus of claim 10 further including a dual action hydraulic arm connected on one end to said material container and on another end to said moveable lid.

14. The apparatus of claim 10 wherein said material container includes a moveable access door.

15. The apparatus of claim 10 further including a precipitator connected to said material container.

16. The apparatus of claim 10 wherein said material is selected from a group consisting of: gas, steam and liquid.

17. A molecular arrangement magnetic treatment method for treating material, the method comprising:
   a. providing a material container with a moveable lid and with an inlet and an outlet, wherein material to be treated is introduced at said inlet and is released at said outlet and wherein said material container is sized so as to provide an enclosed space into which said material expands and loses velocity and through which said material passes;
   b. providing a material passageway within said enclosed space, wherein said material passageway extends between said inlet and said outlet in a manner such that said material must pass through said material passageway;
   c. orienting a plurality of pairs of rod-shaped magnets within said enclosed space, wherein said plurality of rod-shaped magnets are oriented such that material in said material passageway must pass between magnetic poles at opposing end portions of said plurality of pairs of rod-shaped magnets such that said material is given a negative electrical charge and such that, as said material passes between said magnetic poles at said opposing end portions of said plurality of pairs of rod-shaped magnets, said material in the material passageway passes through a magnetic field effect produced by said plurality of rod-shaped magnets, wherein adjacent pairs of said plurality of rod-shaped magnets are oriented such that a north pole of a first magnet of an adjacent pair of magnets is adjacent a south pole of a second magnet of the adjacent pair of magnets and a south pole of the first magnet is adjacent a north pole of the second magnet, wherein said poles of the first magnet provide a first resultant magnetic field and said poles of the second magnet provide a second resultant magnetic field, wherein said first and second resultant magnetic fields jointly define at least a portion of the magnetic field effect and wherein said plurality of rod-shaped magnets are each movably disposed within said enclosed space in a manner allowing said plurality of rod-shaped magnets to move independent of each other such that the magnetic field effect provided by adjacent ones of said plurality of rod-shaped magnets dictates relative positioning of said adjacent ones of said plurality of rod-shaped magnets for causing said adjacent ones of said plurality of rod-shaped magnets to be self-aligning with respect to each other; and
   d. introducing material to be treated into said inlet.

18. The method of claim 17 further comprising the steps of:
   a. connecting a precipitator to said material container; and
   b. precipitating negatively charged material from said material after said material has been negatively charged.

19. The method of claim 17 further comprising the step of providing a moveable access panel to said material container.

20. The method of claim 17 wherein said material to be treated is selected from a group consisting of: gas, steam and liquid.

* * * * *